(12) United States Patent
Takahashi

(10) Patent No.: US 7,209,294 B2
(45) Date of Patent: Apr. 24, 2007

(54) IMAGING LENS DEVICE AND PORTABLE APPARATUS HAVING IMAGING FUNCTION

(75) Inventor: Taizo Takahashi, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 176 days.

(21) Appl. No.: 10/981,111

(22) Filed: Nov. 3, 2004

(65) Prior Publication Data
US 2005/0094284 A1    May 5, 2005

(30) Foreign Application Priority Data
Nov. 5, 2003   (JP) .............................. 2003-375808

(51) Int. Cl.
*G02B 15/02*   (2006.01)
(52) U.S. Cl. ................................... 359/672
(58) Field of Classification Search ................ 359/672, 359/673, 674, 675
See application file for complete search history.

(56) References Cited

U.S. PATENT DOCUMENTS 4,469,396 A * 9/1984 Neil .......................... 359/353
5,013,142 A * 5/1991 Rollin et al. ................ 359/674
5,481,404 A * 1/1996 Kikuchi ....................... 359/674

FOREIGN PATENT DOCUMENTS

JP    2000-023002 A    1/2000

* cited by examiner

*Primary Examiner*—Scott J. Sugarman
(74) *Attorney, Agent, or Firm*—Frishauf, Holtz, Goodman & Chick, P.C.

(57) ABSTRACT

An apparatus includes a body accommodating an imaging plane, and a lens device providing a light beam path and including lens units arranged along and coaxially with the path. The second lens unit next to the most outwardly located first lens unit is reciprocally rotational between a first position, at which the second lens unit is coaxial with the path, and a second position, at which the second lens unit is positioned away from the path. The first lens unit is provided on a cylindrical unit and is reciprocally movable with the cylindrical unit along the optical axis, and is moved to approach the plane while the second lens unit is in the second position to shorten a distance between the first lens unit and the plane in comparison with the distance between the first lens unit and the plane when the second lens unit is in the first position.

14 Claims, 2 Drawing Sheets

IMAGING LENS DEVICE AND PORTABLE APPARATUS HAVING IMAGING FUNCTION

CROSS-REFERENCE TO RELATED APPLICATIONS

This application is based upon and claims the benefit of priority from prior Japanese Patent Application No. 2003-375808, filed Nov. 5, 2003, the entire contents of which are incorporated herein by reference.

BACKGROUND OF THE INVENTION

1. Field of the Invention

The present invention relates to an imaging lens device and a portable apparatus having an imaging function.

2. Description of the Related Art

A portable apparatus having an imaging function, such as a camera, uses an imaging lens device. The imaging lens device provides an imaging light beam path for leading an incident light beam to a predetermined imaging plane, and includes a plurality of lens units, which are arranged along and coaxial with the imaging light beam path, for focusing the incident light beam on the predetermined imaging plane.

Since the imaging lens device includes the plural lens units arranged along the imaging light beam path, the longitudinal length of the imaging lens device is relatively long so that the imaging lens device projects out from the body of the portable apparatus to a large degree.

In the conventional portable apparatus described above, the projecting imaging lens device deteriorates the portability of the conventional portable apparatus. In order to improve the portability of the conventional portable apparatus, Japanese Patent Application KOKAI Publication No. 2000-23002, published on Jan. 21, 2000, discloses causing one lens unit, which is located nearer to the predetermined imaging plane than the lens unit located most away from the predetermined imaging plane, to be movable between a first position, at which the one lens unit is coaxially located in the imaging light beam path, and a second position, at which the one lens unit is moved sideward and away from the imaging light beam path. The sideward movable lens unit is located at the first position when the imaging lens device is used for focusing the incident light on the predetermined imaging plane, and the sideward movable lens unit is located at the second position when the imaging lens device is not used for focusing the incident light on the predetermined imaging plane. While the sideward movable lens unit is located at the second position, the lens unit located farthest away from the imaging plane can be moved toward the predetermined imaging plane by the longitudinal length of the sideward movable lens unit so that the longitudinal length of the imaging lens device can be shortened.

However, in this published portable apparatus, it is difficult to arrange the sideward movable lens unit to be accurately coaxial with the imaging light beam path when the sideward movable lens is moved from the second position to the first position and stays at the first position.

BRIEF SUMMARY OF THE INVENTION

According to one aspect of the invention, an imaging lens device provides an imaging light beam path for leading an incident light beam to a predetermined imaging plane and includes a plurality of lens units arranged along and coaxial with the imaging light beam path for focusing the incident light beam on the predetermined imaging plane. At least one of the plural lens units, excluding a lens unit located farthest away from the predetermined imaging plane, is reciprocally rotational around a rotation center, which is located outside of the imaging light beam path, between a first position, at which the at least one lens unit is coaxially arranged in the imaging light beam path, and a second position, at which the at least one lens unit is positioned away from the imaging light beam path. The lens unit located farthest away from the predetermined imaging plane is reciprocally movable along the imaging light beam path. The lens unit located farthest away from the predetermined imaging plane is moved to approach the predetermined imaging plane while the at least one lens unit is located in the second position, so as to shorten a distance between the predetermined imaging plane and the lens unit located farthest away from the predetermined imaging plane in comparison with the distance between them when the at least one lens unit is located in the first position.

According to another aspect of the invention, a portable apparatus having an imaging function includes a portable apparatus main body having an inner space accommodating an imaging plane, an imaging lens device, which provides an imaging light beam path for leading an incident light beam to the imaging plane, and a plurality of lens units arranged along and coaxial with the imaging light beam path for focusing the incident light beam on the imaging plane. At least one of the plural lens units, excluding a lens unit located farthest away from the imaging plane, is reciprocally rotational around a rotation center located the outside of the imaging light beam path between a first position, at which the at least one lens unit is coaxially arranged in the imaging light beam path, and a second position, at which the at least one lens unit is positioned away from the imaging light beam path. The imaging lens device includes a cylindrical unit, which is provided with the lens unit located farthest from the imaging plane, and which has a diameter surrounding the first and second positions of the at least one lens unit. The cylindrical unit is reciprocally movable together with the lens unit provided thereto along the optical axis of the imaging light beam path. And, the lens unit located farthest away from the imaging plane is moved to approach the imaging plane while the at least one lens unit is located in the second position, so as to shorten a distance between the imaging plane and the lens unit located farthest away from the imaging plane in comparison with the distance between them when the at least one lens unit is located in the first position.

BRIEF DESCRIPTION OF THE DRAWINGS

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

Figure 1:
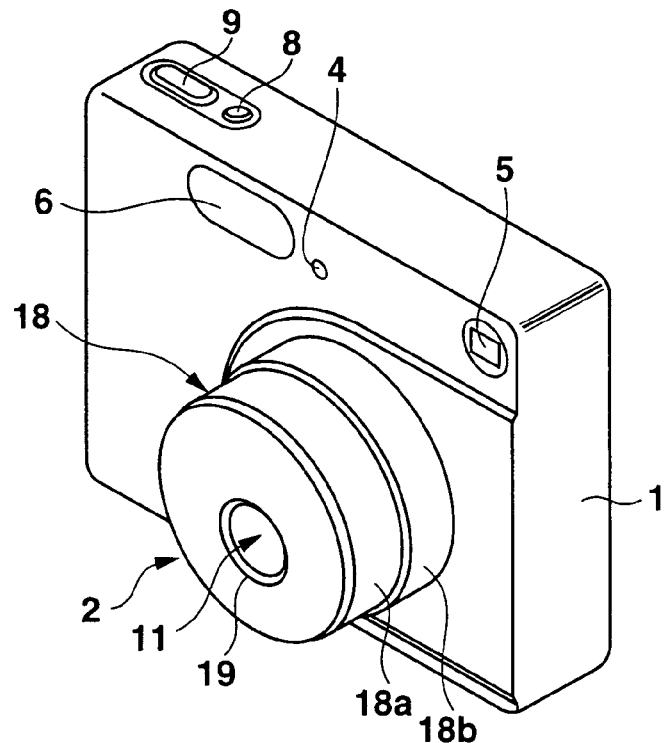
FIG. 1 is a perspective view showing a camera as a portable apparatus having an imaging function, according to an embodiment of the present invention, in which an imaging lens device of the camera is in a use state.
Figure 2:
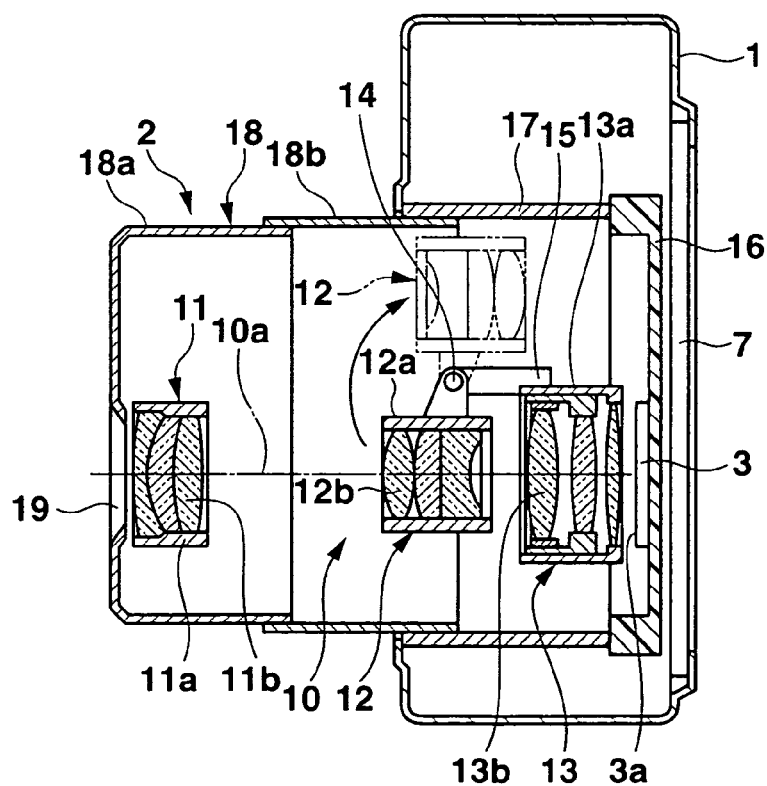
FIG. 2 is a vertical cross sectional view of the camera shown in FIG. 1 along the optical axis of the imaging lens device.
Figure 3:
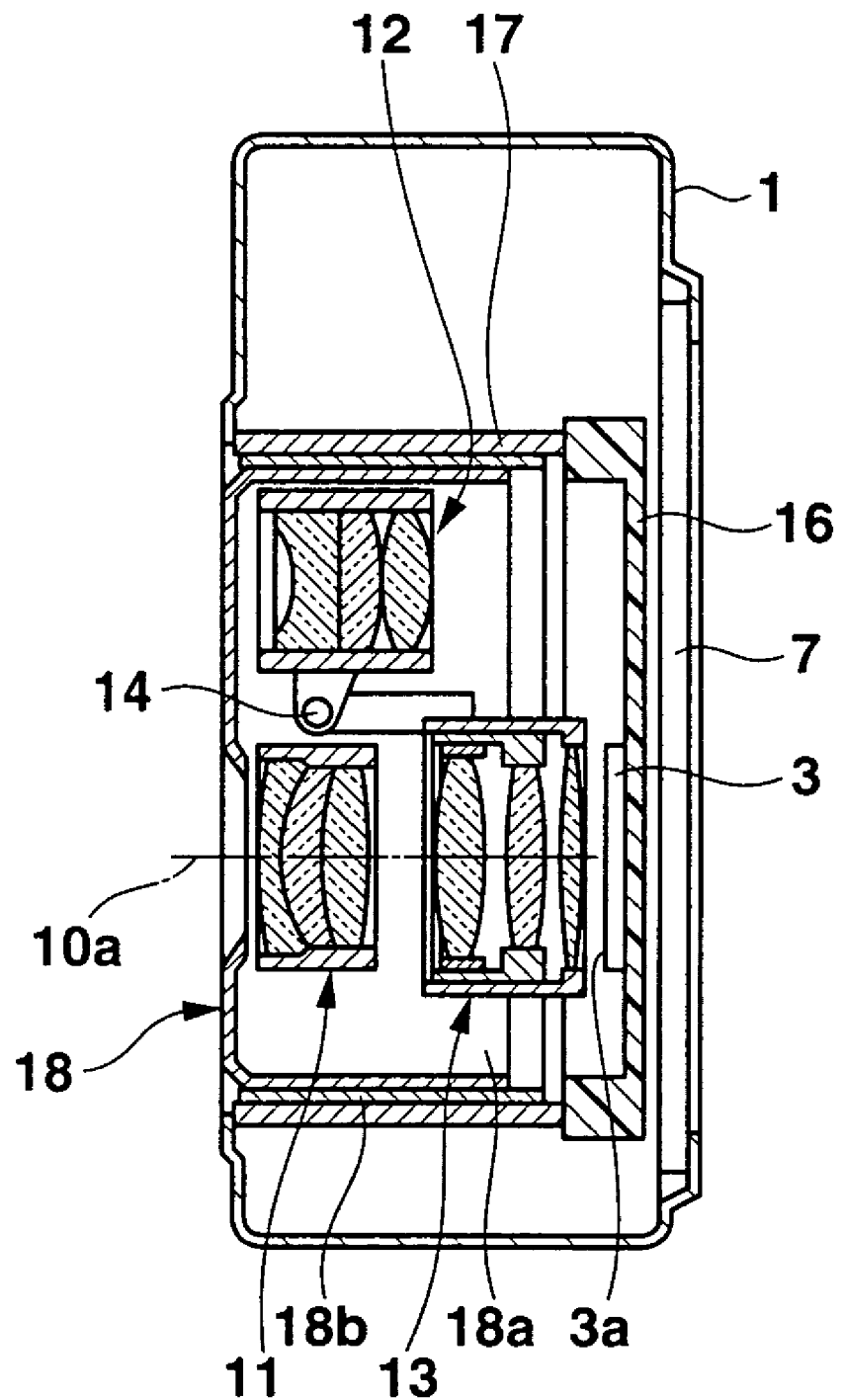
FIG. 3 is a vertical cross sectional view of the camera in which the imaging lens device is in a non-use state.

A portable apparatus having an imaging function according to one embodiment of the present invention is a thin type digital camera. As shown in FIGS. 1 to 3, the portable apparatus has a main body 1 shaped as a thin rectangular case, in which each of the substantially flat front and rear walls thereof are parallel to each other. An imaging lens device 2 is provided to the front wall of the main body 1 and is movable between a projecting position, at which the imaging lens device 2 projects out from the front wall as shown in FIGS. 1 and 2, and a retracted position, at which the imaging lens device 2 is retracted into the inner space of the main body 1 as shown in FIG. 3. The main body 1 accommodates an imaging plane 3a in the inner space.

In this embodiment, the imaging plane 3a is located in a predetermined position near to the inner surface of the rear wall, and the main body 1 includes an image forming unit located on the imaging plane 3a. More specifically, the image forming unit is configured by a Charge Coupled Device (CCD) 3 supported by a supporting member 16 in the inner space of the main body 1. The imaging lens device 2 located in the projecting position provides an imaging light beam path 10 for leading an incident light beam to the imaging plane 3a.

In the front wall of the main body 1, a self-timer lamp 4, a view finder 5 of a finder unit, an electronic flash 6, etc., are provided. And, in the rear wall, a liquid-crystal monitor display 7, a viewfinder eyepiece (not shown), a mode section button (not shown), a zooming operation button (not shown), etc., are provided. Further, in the upper wall of the main body 1, a power switch 8 and a shutter release 9 are provided. And, in the bottom wall of the main body 1, a memory card slot for inserting and ejecting a memory card, which is used for recording images formed on the imaging plane 3a, a serial interface connector for electrically connecting the portable apparatus to an external device such as an personal computer, etc., are provided, all of which are not shown.

The imaging lens device 2 includes a plurality of lens units, which are arranged along and coaxial with the optical axis 10a of the imaging light beam path 10 for focusing the incident light on the imaging plane 3a. In this embodiment, the lens units include a first lens unit 11 located farthest away from the imaging plane 3a, a second lens unit 12 located at a side of the first lens unit 11 nearer to the imaging plane 3a, and a third lens unit 13 located closest to the imaging plane 3a, and forming a zoom lens system. The first lens unit 11 has a cylindrical member 11a and a plurality of lenses 1ib coaxially held in the cylindrical member 11a. The second lens unit 12 also has a cylindrical member 12a and a plurality of lenses 12b coaxially held in the cylindrical member 12a. The third lens unit 13 has a telescopic type cylindrical member 13a and a plurality of lenses 13b coaxially held in the telescopic type cylindrical member 13a.

More specifically, in the third lens unit 13, the plurality of lenses 13b are supported by a plurality of telescopic components of the cylindrical member 13a respectively, and are coaxially movable along the optical axis 10a of the imaging light beam path 10 with respect to each other by the relative movement of the telescopic components.

At least one of the plural lens units excluding the lens unit 11 located farthest away from the imaging plane 3a (the second lens unit 12 in this embodiment) is reciprocally movable rotationally around a rotation center located outside of the imaging light beam path 10 between a first position, at which the at least one lens unit (the second lens unit 12 in this embodiment) is coaxially arranged in the imaging light beam path 10 as shown by a solid line in FIG. 2, and a second position, at which the at least one lens unit (the second lens unit 12 in this embodiment) is positioned away from the imaging light beam path 10 as shown by a two-dots chain line in FIG. 2. The reciprocal rotation of the second lens unit 12 between the first position and the second position is performed by a reciprocal rotation mechanism (not shown) provided in the inner space of the main body 1. In this embodiment, the angle range of the reciprocal rotation is set at 180 degrees.

In this reciprocal rotation of the at least one lens unit (the second lens unit 12 in this embodiment) the optical axis of the second lens unit 12 is moved in a plane including the optical axis 10a of the imaging light beam path 10. An end face of the second lens unit 12, which faces the first lens unit 11 while the second lens unit 12 is located in the first position as shown by the solid line in FIG. 2, is faced in a direction opposite to the first lens unit 11 while the second lens unit 12 is located in the second position as shown by the two-dots chain lines in FIG. 2. And, the second lens unit 12 approaches the finder unit when the second lens unit 12 is rotated from the first position to the second position.

In this embodiment, the rotation center of the second lens unit 12 is configured by a rotational center shaft 14 supported on the outer most telescopic component of the telescopic type cylindrical member 13a with a shaft position adjustment mechanism 15. The shaft position adjustment mechanism 15 supports the rotational center shaft 14 outside of the imaging light beam path 10 such that the rotational center shaft 14 crosses the plane including the optical axis 10a of the imaging light beam path 10 at right angles. The shaft position adjustment mechanism 15 can adjust the position of the rotational center shaft 14 in a direction along and in parallel with the optical axis 10a of the imaging light beam path 10.

The imaging lens device 2 further includes a base cylindrical member 17, which is accommodated in the inner space of the main body 1, and a telescopic type cylindrical unit 18, which is telescopically connected to the base cylindrical member 17. The base cylindrical member 17 and the telescopic type cylindrical unit 18 are eccentrically arranged to the optical axis 10a of the imaging light beam path 10. The base cylindrical member 17 has a diameter surrounding the third lens unit 13, the first and second positions of the second lens unit 12, the first lens unit 11 and the shaft position adjustment mechanism 15 with the rotational center shaft 14, and the base end of the base cylindrical member 17 is fixed to the supporting member 16. The forward end of the base cylindrical member 17 is supported by the inner surface of the front wall of the main body 1 to be coaxial with a hole, which is formed in the front wall, for projecting the imaging lens device 2.

The third lens unit 13 is fixed to the base cylindrical member 17 such that the distance between the lens located nearest to the imaging plane 3a in the third lens unit 13 and the imaging plane 3a is set to be a predetermined distance.

The telescopic type cylindrical unit 18 has two telescopic cylinders 18a and 18b, each having a diameter surrounding the third lens unit 13, the first and second positions of the second lens unit 12, the first lens unit 11 and the shaft position adjustment mechanism 15 with the rotational center shaft 14. The longitudinal length of each of the two telescopic cylinders 18a and 18b is shorter than the longitudinal length of the base cylindrical member 17, and the telescopic movements of the two telescopic cylinders 18a and 18b relative to the base cylindrical member 17 are caused by a cam drive mechanism (not shown) accommodated in the inner space of the main body 1.

The forward cylinder 18a has a forward end wall, in which an opening is formed to be coaxial with the optical axis 10a of the imaging light beam path 10.

The opening in the forward end wall of the forward cylinder 18a allows the light beam to be led from the outside of the telescopic type cylindrical unit 18 into the inside thereof along the optical axis 10a of the imaging light beam path 10. The first lens unit 11 is fixed to the forward cylinder 18a such that the first lens unit 11 is arranged to be coaxial with the opening of the forward end wall of the forward cylinder 18a.

In this embodiment, a lens cover (not shown) is provided on the inner surface of the forward end wall of the forward cylinder 18a. The lens cover is moved between a closed position, at which the lens cover closes the opening of the forward end wall of the forward cylinder 18a, and an open position, at which the lens cover opens the opening, by a lens cover driving mechanism (not shown), in response to the reciprocal movement of the telescopic type cylindrical unit 18 between the projecting position and the retracted position. Concretely, the lens cover is located in the closed position when the telescopic type cylindrical unit 18 is located in the retracted position, and the lens cover is located in the opening position when the telescopic type cylindrical unit 18 is located in the projecting position.

In the following, an operation of the above described thin type digital camera as the portable apparatus having an imaging function according to one embodiment of the present invention will be described.

While the digital camera is not used for photographing, the power switch 8 is turned off or the mode selection key is operated to select any one of various modes excluding a photographing mode such as an image monitoring mode for displaying an image, which has been photographed, on the monitor display 7, and an image outputting mode for outputting data of the image, which has been photographed, to the external device in a state in which the power switch 8 has been turned on. At this time, the second lens unit 12 is located in the second position and the first lens unit 11 together with the telescopic type cylindrical unit 18 is located in the retracted position in the inner space of the main body 1 as shown in FIG. 3. The first lens unit 11 together with the telescopic type cylindrical unit 18 has been moved to approach to the imaging plane 3a and arranged in the first position of the second lens unit 12 to shorten the distance between the first lens unit 11 and the imaging plane 3a. And, the lens cover (not shown) has closed the opening in the forward end wall of the forward cylinder 18a to prevent an outer force from being applied thereto through the opening so that the first lens unit 11 is protected from the outer force. Further, the outer surface of the forward end wall of the forward cylinder 18a is flat with the outer surface of the front wall of the main body 1.

In order to use the digital camera for photographing, the power switch 8 is turned on or the mode selection key is operated to select the photographing mode in the state in which the power switch 8 has been turned on. At this time, the telescopic type cylindrical unit 18 is moved from the retracted position as shown in FIG. 3 to the projecting position as shown in FIGS. 1 and 2 by the cam drive mechanism (not shown), and is projected from the front wall of the main body 1. Further, the lens cover (not shown) is moved from the closed position to the open position, and the first lens unit 11 is moved outward from the first position of the second lens unit 12 and away from the imaging plane 3a. After the first lens unit 11 reaches its most outwardly projected position, the second lens unit 12 is moved from the second position as shown by the two-dots chain line in FIG. 2 to the first position as shown by the solid line in FIG. 2 by the reciprocal movement driving mechanism (not shown) with the forward movement of the first lens unit 11.

When the second lens unit 12 is located in the first position, the first lens unit 11, the second lens unit 12 and the third lens unit 13 form the zoom lens system.

Then, when the shutter release 9 is pushed to a half stroke, at least one of the lenses in the third lens unit 13 is moved along the optical axis 10a by moving at least one of the plurality of telescopic components of the cylindrical member 13a and/or the second lens unit 12 is moved along the optical axis 10a by the shaft position adjustment mechanism 15, so that an object can be focused on the imaging plane 3a. Further, when the shutter release 9 is pushed to a full stroke, the image of the object focused on the imaging plane 3a is stored in the memory card accommodated in the main body through the image forming unit such as the CCD.

When the zooming operation button (not shown) is operated, the telescopic type cylindrical unit 18 together with the first lens unit 11 is telescopically moved along the optical axis 10a to change the angle of view of the zoom lens system. And, at the same time, at least one of the lenses in the third lens unit 13 is moved along the optical axis 10a by moving at least one of the plurality of telescopic components of the cylindrical member 13a and/or the second lens unit 12 is moved along the optical axis 10a by the shaft position adjustment mechanism 15, so that an object can be focused on the imaging plane 3a.

When the power switch 8 is turned off or the mode selection key is operated to select any one of various modes excluding the photographing mode such as the image monitoring mode and the image outputting mode in the state in which the power switch 8 has been turned on while the telescopic type cylindrical unit 18 is located in the projecting position, at first the telescopic type cylindrical unit 18 together with the first lens unit 11 is moved to its most outwardly projected position to move the first lens unit 11 fully away from the first position of the second lens unit 12. Then, the second lens unit 12 is moved from the first position as shown by the solid line in FIG. 2 to the second position as shown by the two-dots chain line in FIG. 2, and the telescopic type cylindrical unit 18 together with the first lens unit 11 is moved to its retracted position as shown in FIG. 3.

As is apparent from the above description, since the rotational center shaft 14 functioning as the rotational center of the second lens unit 12 is located outside of the imaging light beam path 10 so as to cross the plane including the optical axis 10a of the imaging light beam path 10 at right angles, the distance between the optical axis of the second lens unit 12 and the rotational center shaft 14 will not change during the reciprocal rotation of the second lens unit 12 around the rotational center shaft 14 between the first position and the second position. Therefore, when the second lens unit 12 is rotated from the second position to the first position, the second lens unit 12, which at its first position, is always surely arranged coaxially with the optical axis 10a of the imaging light beam path 10 with high accuracy.

Further, since the second lens unit 12 is rotated from the first position to the second position when the digital camera is not used for photographing, the first lens unit 11 can be moved to the first position of the second lens unit 12 to shorten the distance between the first lens unit 11 and the imaging plane 3*a* in the inner space of the main body 1 in comparison with the distance between the first lens unit 11 and the imaging plane 3*a* when the second lens unit 12 is located in the first position.

Still further, since the end face of the second lens unit 12, which faces the first lens unit 11, while the second lens unit 12 is located in the first position, is faced in a direction opposite to the first lens unit 11 while the second lens unit 11 is located in the second position, the second position of the second lens unit 12 will not largely project forward from the first position in the direction along the optical axis 10*a* of the imaging light beam path 10. This makes the longitudinal length of the imaging lens device 2 shorter while the digital camera is not used for photographing.

The connecting point of the second lens unit 12 to the rotational center shaft 14 in the direction along the optical axis 10*a* may be changed so that the location of the second position of the second lens unit 12 relative to the first position thereof in the direction along the optical axis 10*a* may be changed.

In this embodiment, since each of the two telescopic cylinders 18*a* and 18*b* of the telescopic type cylindrical unit 18 has a diameter surrounding the third lens unit 13, the first and second positions of the second lens unit 12, the first lens unit 11 and the shaft position adjustment mechanism 15 with the rotational center shaft 14, the two telescopic cylinders 18*a* and 18*b* of the telescopic type cylindrical unit 18 will not collide with the third lens unit 13, the second lens unit 12 whether it is located in the first position or in the second positions, the first lens unit 11 and the shaft position adjustment mechanism 15 with the rotational center shaft 14, when each of the two telescopic cylinders 18*a* and 18*b* is located in the retracted position. This makes the longitudinal length of the telescopic type cylindrical unit 18 when each of the two telescopic cylinders 18*a* and 18*b* is located in the retracted position shorter, and further makes the size of the main body 1, in which the retracted two telescopic cylinders 18*a* and 18*b* of the telescopic type cylindrical unit 18 are accommodated, shorter in the direction along the optical axis 10*a*.

Therefore, when the two telescopic cylinders 18*a* and 18*b* of the telescopic type cylindrical unit 18 are located in the retracted position, they are fully accommodated in the inner space of the main body and will not project from the main body 1 so that the outer surface of the main body 1 can be smooth to improve the portability of the digital camera while it is not used for photographing.

The telescopic type cylindrical unit 18 has the two telescopic cylinders 18*a* and 18*b* in this embodiment, but the telescopic type cylindrical unit 18 may have only one telescopic cylinder, or three or more telescopic cylinders.

The imaging lens device 2 has the first, second and third lens units 11, 12 and 13 in this embodiment, but the imaging lens device 2 may have two, or four or more lens units.

The second lens unit 12 is reciprocally rotatable between the first position and the second position in this embodiment, but the lens unit, which is located nearest to the imaging plane 3*a* in the plurality of lens units of the imaging lens device 2 and which corresponds to the third lens unit 13 in this embodiment, may be reciprocally rotational between the first position and the second position around the rotational center located outside of the imaging light beam path 10*a* instead of the lens unit 12. In this case, after the lens unit, which is located nearest to the imaging plane 3*a* and which corresponds to the third lens unit 13 in this embodiment, is moved from the first position to the second position, the remaining lens units, which correspond to the first and second lens units 11 and 12, are moved to the first position of the lens unit, which is located nearest to the imaging plane 3*a* and which corresponds to the third lens unit 13 in this embodiment, to shorten the longitudinal length of the second lens unit 12 along the optical axis 10*a* of the imaging light beam path 10. And, the reciprocally rotational angle range of the lens unit, which is located nearest to the imaging plane 3*a* and which corresponds to the third lens unit 13 in this embodiment, may be 90 degrees.

The plurality of lenses of the third lens unit 13, which is located nearest to the imaging plane 3*a*, are movable along the optical axis 10*a* of the imaging light beam path 10 relative to each other in this embodiment, but the third lens unit 13 may have only one lens, which is movable along the optical axis 10*a* to focus the incident light beam on the imaging plane 3*a*.

Further, the portable apparatus having an imaging function is the thin type digital camera in this embodiment, but the portable apparatus according to the present invention may be another type of digital camera, a normal camera using film as an image recording medium, a mobile phone with a digital camera, etc.

Additional advantages and modifications will readily occur to those skilled in the art. Therefore, the invention in its broader aspects is not limited to the specific details and representative embodiment shown and described herein. Accordingly, various embodiments may be made without departing from the spirit or scope of the general inventive concept as defined by the appended claims and their equivalents.

What is claimed is:

1. An imaging lens device which provides an imaging light beam path for leading an incident light beam to a predetermined imaging plane, the imaging lens device comprising:

a plurality of lens units which are arranged along and coaxial with the imaging light beam path and which focus the incident light beam on the predetermined imaging plane;

wherein the plurality of lens units comprise:

a first lens unit which is located farthest away from the predetermined imaging plane of the plurality of lens units;

at least one additional lens unit, excluding the first lens unit, which is reciprocally rotatable around a rotation center line between a first position and a second position, such that when the additional lens unit is in the first position the additional lens unit is coaxially arranged in the imaging light beam path, and when the additional lens unit is in the second position the additional lens unit is positioned out of the imaging light beam path, wherein the rotation center line extends in a direction crossing the imaging light beam path in a plane located outside of the imaging light beam path;

wherein the first lens unit is reciprocally movable along the imaging light beam path; and wherein the first lens unit is moved to approach the predetermined imaging plane to be located in the first position of the additional lens unit when the additional lens unit is located in the second position, such that a distance between the first lens unit and the predetermined imaging plane is shorter than a distance between the first lens unit and the predetermined imaging plane when the additional lens unit is located in the first position.

2. The imaging lens device according to claim 1, wherein an optical axis of the at least one additional lens unit moves in a plane including an optical axis of the imaging light beam path while the at least one additional lens unit reciprocally rotates between the first position and the second position.

3. The imaging lens device according to claim 1, wherein the plurality of lens units comprises:
   the first lens unit;
   a second lens unit which is located nearer to the predetermined imaging plane than the first lens unit, and which is said additional lens unit; and
   a third lens unit located nearest to the predetermined imaging plane.

4. The imaging lens device according to claim 1, wherein an end face of the at least one additional lens unit, which faces the first lens unit while the additional lens unit is located in the first position, faces in a direction opposite to the first lens unit while the additional lens unit is located in the second position.

5. The imaging lens device according to claim 1, further comprising a cylindrical unit, which has a diameter surrounding the first and second positions of the at least one additional lens unit and is reciprocally movable along the optical axis of the imaging light beam path;
   wherein the first lens unit is mounted to the cylindrical unit so as to be reciprocally movable along the optical axis of the imaging light beam path together with the cylindrical unit.

6. The imaging lens device according to claim 1, wherein at least one of the plurality of lens units comprises a plurality of lenses.

7. A portable apparatus having an imaging function, comprising:
   an apparatus main body including an inner space which accommodates an imaging plane; and
   an imaging lens device, which provides an imaging light beam path for leading an incident light beam to the imaging plane, and which includes a plurality of lens units arranged along and coaxial with the imaging light beam path to focus the incident light beam on the imaging plane;
   wherein the plurality of lens units comprise:
      a first lens unit which is located farthest away from the imaging plane of the plurality of lens units;
      at least one additional lens unit, excluding the first lens unit, which is reciprocally rotatable around a rotation center line between a first position and a second position, such that when the additional lens unit is in the first position the additional lens unit is coaxially arranged in the imaging light beam path, and when the additional lens unit is in the second position the additional lens unit is positioned out of the imaging light beam path, wherein the rotation center line extends in a direction crossing the imaging light beam path in a plane located outside of the imaging light beam path;
   wherein the imaging lens device further comprises a cylindrical unit, which has a diameter surrounding the first and second positions of the at least one additional lens unit and is reciprocally movable along an optical axis of the imaging light beam path, and wherein the first lens unit is coupled to the cylindrical unit so as to be reciprocally movable along the optical axis of the imaging light beam path together with the cylindrical unit; and
   wherein the first lens unit is moved to approach the imaging plane to be located in the first position of the additional lens unit when the additional lens unit is located in the second position, such that a distance between the first lens unit and the imaging plane is shorter than a distance between the first lens unit and the imaging plane when the additional lens unit is located in the first position.

8. The portable apparatus according to claim 7, wherein the cylindrical unit, together with the first lens unit, is positioned in the inner space of the apparatus main body when the first lens unit is moved to approach the imaging plane and is located in the first position of the additional lens unit, while the at least one additional lens unit is located in the second position; and
   wherein the cylindrical unit, together with the first lens unit, is moved out from the inner space of the apparatus main body when the first lens unit is moved away from the imaging plane to enable rotation of the at least one additional lens unit from the second position to the first position.

9. The portable apparatus according to claim 7, wherein an optical axis of the at least one additional lens unit moves in a plane including the optical axis of the imaging light beam path while the at least one additional lens unit reciprocally rotates between the first position and the second position.

10. The portable apparatus according to claim 7, wherein the plurality of lens units comprises:
    the first lens unit;
    a second lens unit which is located nearer to the predetermined imaging plane than the first lens unit, and which is said additional lens unit; and
    a third lens unit located nearest to the predetermined imaging plane.

11. The portable apparatus according to claim 7, wherein an end face of the at least one additional lens unit, which faces the first lens unit while the additional lens unit is located in the first position, faces in a direction opposite to the first lens unit while the additional lens unit is located in the second position.

12. The portable apparatus according to claim 7, wherein at least one of the plurality of lens units comprises a plurality of lenses.

13. The portable apparatus according to claim 7, wherein the apparatus main body further comprises an image forming unit located on the imaging plane.

14. The portable apparatus according to claim 7, wherein the portable apparatus main body further comprises a finder unit, and the at least one additional lens unit approaches the finder unit when the at least one additional lens unit is rotated from the first position to the second position.

* * * * *